Dec. 22, 1942. A. P. COTTON 2,305,677
SUN VISOR
Filed Feb. 21, 1942 2 Sheets-Sheet 1
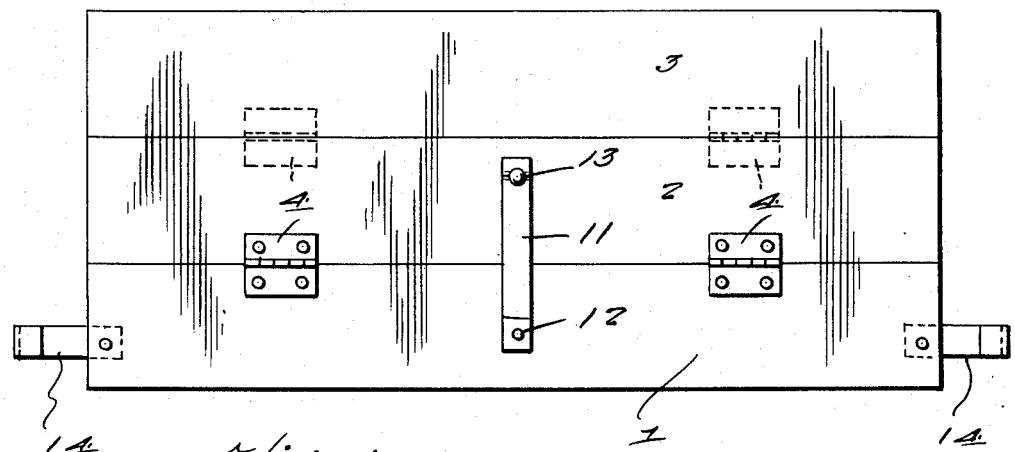
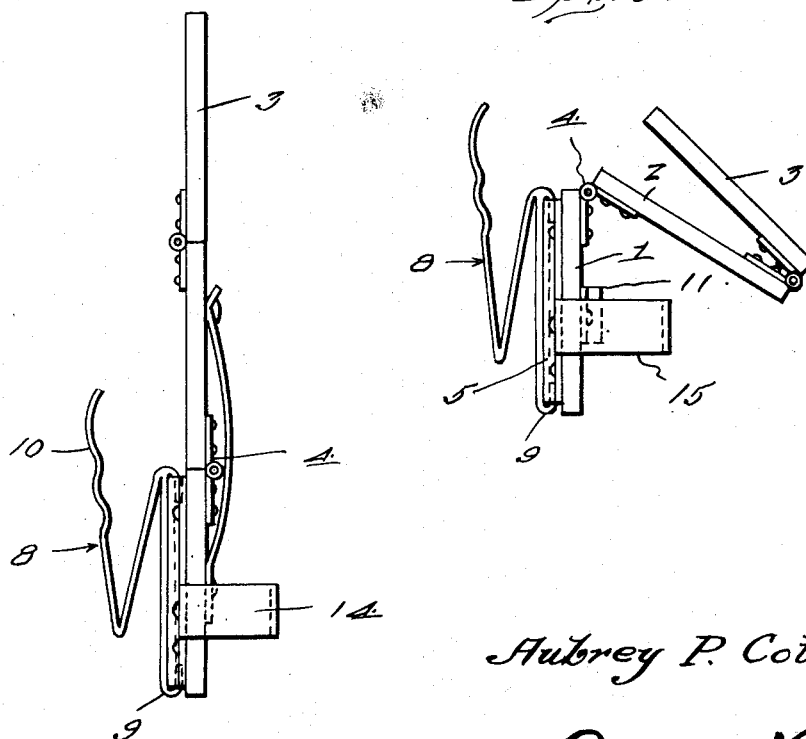
Inventor
Aubrey P. Cotton
By Clarence A. O'Brien
and Harvey B. Jacobson
Attorneys Dec. 22, 1942.  A. P. COTTON  2,305,677
SUN VISOR
Filed Feb. 21, 1942  2 Sheets-Sheet 2
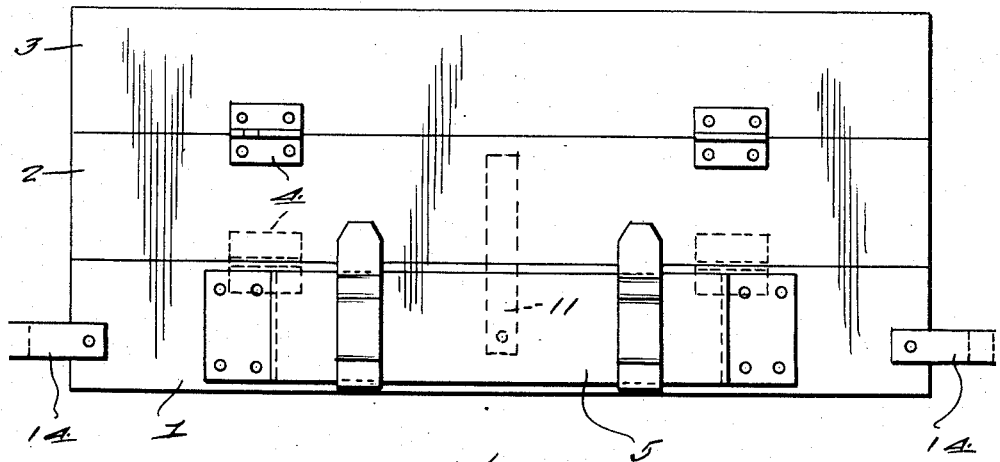
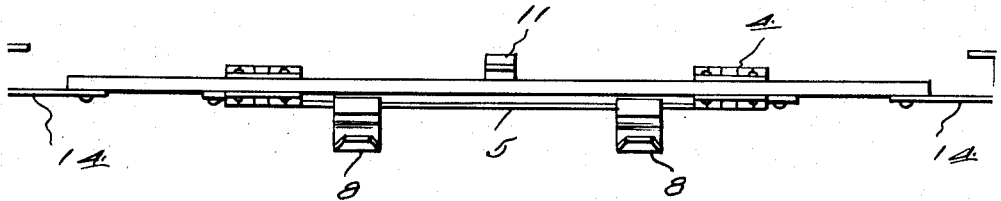
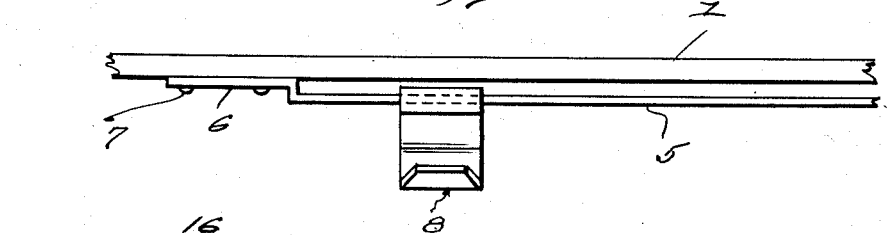
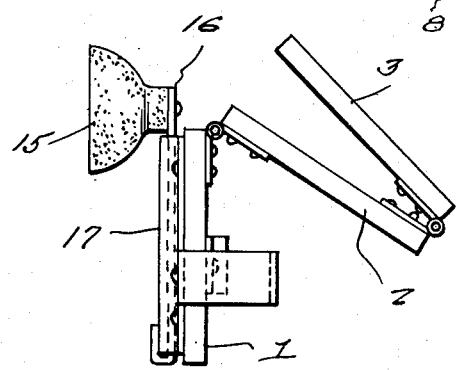
Inventor
Aubrey P. Cotton
By Clarence A. O'Brien
and Harvey B. Jacobson
Attorneys Patented Dec. 22, 1942

2,305,677

UNITED STATES PATENT OFFICE 2,305,677

SUN VISOR

Aubrey P. Cotton, St. Matthews, S. C.

Application February 21, 1942, Serial No. 431,868

2 Claims. (Cl. 296—97)

My invention relates to improvements in sun visors for automobiles, the principal object in view being to provide an inexpensive, simply constructed device for easy attachment to and detachment from the body structure of present day automobiles at the bottom of the windshield, and for use by drivers to cut down glare from the sun, especially when caused by reflection from the hood of the automobile.

Another object is to provide a device of the character and for the purpose above set forth adapted for attachment to the body structure without any change in or addition to said structure.

Other and subordinate objects are also comprehended by my invention, all of which, together with the precise nature of my improvements, will be readily understood when the succeeding description and claims are read with reference to the drawings accompanying and forming part of this specification.

In said drawings:

Figure 1 is a view in rear elevation of my improved sun visor in its preferred embodiment with the panels unfolded, Figure 2 is a view in front elevation, Figure 3 is a view in top plan, Figure 4 is a view in end elevation drawn to an enlarged scale, Figure 5 is a view similar to Figure 4 showing the panels partly folded, Figure 6 is a fragmentary view in top plan of the bottom panel and parts carried thereby, and Figure 7 is a view of a modified embodiment of the invention.

Referring to the drawings by numerals, and first to Figures 1 to 6 thereof, in its preferred embodiment my improved sun visor comprises a series of bottom, intermediate, and upper panels 1, 2, 3, respectively, of elongated rectangular form and suitable opaque, light, strong material, the intermediate panel 2 being hinged at one side edge thereof, as at 4, to a top side edge of the lower panel, on what constitutes the rear side of the visor, and similarly connected at its other side edge to a side edge of the upper panel 3 on what constitutes the front side of the visor, whereby said panels, as best shown in Figures 1, 2 and 4, may be unfolded into edge-to-edge relation to form an upright structure, or folded, in a manner shown in Figure 5, into side-by-side relation one behind another to reduce the overall height of the structure.

On the front side of the lower panel 1 is a longitudinally extending flat metal guide rail 5 having rearwardly offset ends 6 secured, as at 7, to said panel, and an intermediate portion spaced from the panel.

A pair of upright V-shaped clamps 8 of flat resilient metal are mounted on said rail 5 for relative lateral adjustment thereon in front of the lower panel 1 and by means of flat loop extensions 9 fitting around the intermediate portion of the rail 5 and slidable thereon. The clamps 8 are designed to be inserted downwardly into the usual slots, not shown, provided at the top of the instrument panel of an automobile for discharging air from a heater, said clamps 8 frictionally interlocking with said slots so that the panels 1, 2, 3 are held upright behind the windshield, not shown. One leg of each clamp 8 is preferably corrugated, as at 10, to facilitate interlocking with said slots. The clamps 8 may be faced with any suitable material, not shown, to prevent marring the edges of said slots. Also, the clamps 8 are of less width than the slots so as not to interfere with the discharge of air from the slots. By flexing the free leg of each clamp 8 toward the other leg, said clamps may be readily disengaged and withdrawn from the slots to remove the visor.

An elongated, resilient bar 11 is pivoted at one end thereof, as at 12, to the lower panel 1 on the rear face of the latter for swinging upwardly behind the intermediate panel to maintain these two panels unfolded and upright. The upper panel 3 is designed to be held upright and unfolded by contact with the windshield. A hand grip knob 13 is provided on the bar 11 for swinging the same into and from upright position so that the panels may be folded or unfolded. By flexing the bar 11, when upright, rearwardly, the intermediate panel 2 may be swung rearwardly on its hinges 4 sufficiently to permit the upper panel 3 to be folded forwardly in front of the intermediate one, so as to decrease the height of the visor by one-third, as for instance, for short stature drivers to see over. By swinging the bar 11 down alongside the lower panel 1, the visor may be conditioned for folding of the panels alongside each other so that clear vision through the windshield may be had.

A pair of L-shaped clips 14 are pivoted at one end thereof on the lower panel 1 adjacent opposite ends of the latter for swinging over the folded panels 1, 2 and 3 in straddling relation thereto to maintain the same folded.

In Figure 7 my improved visor has been shown as equipped with means for attaching the same to the windshields of automobiles which are not provided with the air discharge slots. For this purpose, a pair of rubber suction cups 15 are suitably mounted on the upper ends of hanger bars 16 inserted downwardly between the rail 17, corresponding to guide rail 5, said bars having lower ends looped around the lower edge of the rail 17 so that the bars and cups 15 are adjustable along said rail. Otherwise the construction and arrangement is as described with reference to the preferred embodiment of my invention.

The foregoing, it is believed, will suffice to impart a clear understanding of my invention together with the manifold advantages thereof.

Although the foregoing description sets forth the invention in detail, it is to be understood that the present disclosure is illustrative rather than restrictive, and that right is herein reserved to changes in form, structure and arrangement of parts falling within the scope of the claims appended hereto.

What I claim is:

1. A sun visor for use between the driver and the windshield of an automobile comprising a series of elongated panels of opaque material hinged one to another for unfolding into edge-to-edge superposed relation and for folding into side-by-side relation, means to attach one of said panels to a fixed part of the automobile, behind said windshield and in upright position adjacent the bottom of the windshield, means on one panel for maintaining another panel in unfolded position, and keepers on said one panel for locking the panels in folded position, said attaching means comprising V-shaped spring clamps on said one panel adapted for insertion downwardly into openings on top of the instrument panel of the automobile.

2. A sun visor for use between the driver and the windshield of an automobile comprising a series of elongated panels of opaque material hinged one to another for unfolding into edge-to-edge superposed relation and for folding into side-by-side relation, means to attach one of said panels to a fixed part of the automobile, behind said windshield and in upright position adjacent the bottom of the windshield, means on one panel for maintaining an adjacent panel in unfolded position, and keepers on said one panel for locking the panels in folded position, said attaching means comprising V-shaped spring clamps on said one panel adapted for insertion downwardly into openings on top of the instrument panel of the automobile.

AUBREY P. COTTON.